United States Patent Office 3,576,919
Patented Apr. 27, 1971

1

3,576,919
POLYMERIC PHOSPHITE PENTAERYTHRITOL TRIADS
Kenneth H. Rattenbury, Morgantown, W. Va., assignor to Weston Chemical Corporation, New York, N.Y.
No Drawing. Filed Aug. 5, 1968, Ser. No. 749,981
Int. Cl. C07f 9/08
U.S. Cl. 260—927
20 Claims

ABSTRACT OF THE DISCLOSURE

Compounds are prepared having one of the formulae (1)
HORO—R$_1$—ORO—P—OROR$_1$ORO—P—OROR$_1$OROH
                          |                    |
                          O                    O
                          R$_2$               R$_2$ and (2)
HOROR$_1$—ORO—P—OROR$_1$ORO—P—OROR$_1$OROH
                        |                    |
                        O                  O
                        |                   R$_2$
                   L(ROR$_1$ORO—P—OROR$_1$ORO—P—OROR$_1$OROH)$_m$
                               |                    |
                               O                  O
                               R$_2$
                    LROR$_1$ORO—P—OROR$_1$ORO—P—OROR$_1$OROH
                                  |                  |
                                 O               O
                               R$_2$              R$_2$ where R is the divalent residue of a hydrogenated dihydric phenol, R$_1$ is

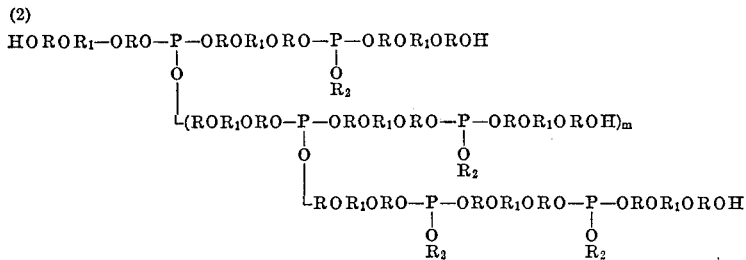

R$_2$ is alkyl, aryl, aralkyl, haloaryl, or alkenyl. Preferably R is the divalent residue of hydrogenated Bisphenol A and m is 0 or an integer.

2

The pentaerythritol nucleus can be replaced by the dipentaerythritol or tripentaerythritol nucleus.
The compounds are useful as stabilizers.

The present invention relates to the preparation of novel heterocyclic phosphites.
It is an object of the present invention to prepare novel phosphites.
Another object is to develop novel stabilizers for hydrocarbon, polymers, halogen containing polymers, natural and synthetic rubbers and other polymers.
A more specific object is to prepare stabilizers for rigid polyvinyl chloride resins.
Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.
It has now been found that these objects can be attained by preparing phosphites having one of the formulae (1)
HORO—R$_1$—ORO—P—OROR$_1$ORO—P—OROR$_1$OROH
                          |                    |
                          O                    O
                          R$_2$               R$_2$ and (2)
HOROR$_1$—ORO—P—OROR$_1$ORO—P—OROR$_1$OROH
                        |                    |
                        O                  O
                        |                   R$_2$
                   L(ROR$_1$ORO—P—OROR$_1$ORO—P—OROR$_1$OROH)$_m$
                               |                    |
                               O                  O
                               R$_2$
                    LROR$_1$ORO—P—OROR$_1$ORO—P—OROR$_1$OROH
                                  |                  |
                               O               O
                               R$_2$              R$_2$ where R is the divalent residue of a hydrogenated dihydric phenol, $R_1$ is

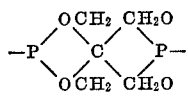

$R_2$ is alkyl, aryl, aralkyl, haloaryl or alkenyl, and $m$ is 0 or an integer, e.g. 1, 2, 3, 4, 5, 6, 7 8, 10, 12, 14, 16 or 17. Preferably R is the divalent residue of hydrogenated Bisphenol A. Preferably $R_2$ is a higher alkyl e.g. hexadecyl or octadecyl or higher alkenyl, e.g. oleyl (Δ9-octadecenyl) or higher alkyl phenyl, e.g. p-nonylphenyl and $m$ is 1.

The phosphites as will be observed are heterocyclic derivatives of pentaerythritol. In place of the 2,4,8,10-tetraoxa-3,9-diphosphaspiro (5,5) undecane ring nucleus compounds set forth above there can be prepared analogous derivatives of dipentaerythritol or tripentaerythritol using as a starting material in place of 3,9-diphenoxy-2,4,8,10-tetraoxa-3,9-diphosphaspiro (5,5) undecane (diphenyl pentaerythritol diphosphite) of Hechenbleikner Patent 2,847,443 Example 3 the corresponding dipentaerythritol or tripentaerythritol compounds. Also a portion of the diphenyl pentaerythritol diphosphite or analogous diphosphite, e.g. 0.1 to 20 molar percent can be replaced by the analogous dipentaerythritol or tripentaerythritol derivatives.

The products of the present invention can be prepared in the following fashion. One mole of a compound having the formula (3)

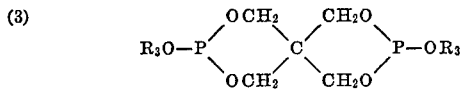

with 2 moles of a hydrogenated dihydric phenol to form a product having the formula (4)

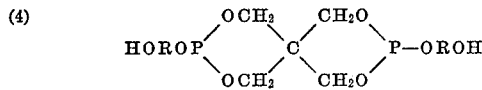

where $R_3$ is alkyl of 1 to 10 or 12 carbon atoms, phenyl or lower alkyl phenyl, halophenyl or lower chloroalkyl and R is as previously defined. Typical examples of suitable starting compounds of Formula 3 are diphenyl pentaerythritol diphosphite, diisodecyl pentaerythritol diphosphite, dimethyl pentaerythritol diphosphite, di (2-chloropropyl) pentaerythritol diphosphite, didecyl pentaerythritol diphosphite, di-p-tolyl pentaerythritol diphosphite, phencyl decyl pentaerythritol diphosphite, di(2-chlorophenyl) pentaerythritol diphosphite, as well as the analogous materials set forth in Friedman Patents 2,047,608 and 3,053,878, Gould Patent 2,961,454 and Hechenbleikner Patent 2,847,443.

The compounds of the present invention can be prepared in several fashions using the compounds of Formula 4 as starting material. Thus they can be prepared by heating the reactants in the ratio of 3 moles of the compound of Formula 4 with 2 moles of a compound having the formula (5)

where $R_4$, $R_5$ and $R_6$ are alkyl, aryl, haloaryl or alkyenl and removing the monohydric phenol or monohydric alcohol form.

The compounds of Formula 1 can be considered as Triads. The compounds of Formula 2 can be considered as built up of a plurality of such Triads, e.g. 2, 3, 4, 5, 6, 17 Triads. The amount of monohydric phenol or alcohol removed to prepare the various compounds of the present invention are shown in the following table where $n$ designates the number of Triad units in the monomer ($n=1$) or polymer ($n=$an integer greater than 1) molecule when the compound of Formula 4 is reacted with the compound having Formula 5 in the ratio of 3 to 2. The molecular weight of the compound in Table 1 is based on compound 4 being triphenyl phosphite and using hydrogenated Bisphenol A as the hydrogenated dihydric phenol. The molecular weight per $n$ unit of course will vary depending on the R and $R_2$ groups present in the product.

TABLE 1

| Triads | Phenol (or alcohol) out Total | Phenol (or alcohol) out Per "n" | Molecular weight of compound | Phosphorus atoms per molecule | Hydroxyl group |
|---|---|---|---|---|---|
| 1 | 4 | 4 | 2,264 | 8 | 2 |
| 2 | 9 | 4.5 | 4,434 | 16 | 3 |
| 3 | 14 | 4.67 | 6,604 | 24 | 4 |
| 4 | 19 | 4.75 | 8,774 | 32 | 5 |
| 5 | 24 | 4.80 | 10,944 | 40 | 6 |
| 6 | 29 | 4.83 | 13,114 | 48 | 7 |
| 7 | 34 | 4.85 | 15,284 | 56 | 8 |
| 8 | 39 | 4.86 | 17,454 | 64 | 9 |
| 9 | 44 | 4.88 | 19,624 | 72 | 10 |
| 10 | 49 | 4.89 | 21,794 | 80 | 11 |
| 11 | 54 | 4.91 | 23,964 | 88 | 12 |
| 12 | 59 | 4.91 | 26,134 | 96 | 13 |
| 17 | 84 | 4.94 | 36,984 | 136 | 18 |

Preferably the compounds prepared have molecular weights of not over 7000 so that $n$ is 1, 2 or 3, most preferably the molecular weight is not over about 5000.

The alcohol or phenol which is removed should have a boiling point of not over 250° C. at atmospheric pressure since otherwise it is difficult to remove the monohydric alcohol or phenol without decomposing the desired product. There is no problem, however, in preparing products containing higher alkyl, haloaryl, aryl or alkenyl groups, however, since all that is required is that the tertiary phosphite of Formula 5 be a mixed phosphite or mixture of mixed phosphites having sufficient alkyl or aryl groups to form the lower boiling alcohols and phenols which are removed while the balance of the groups are the higher boiling alkyl or aryl groups which are to be retained. Thus to form Triads where the $R_2$ group is to be stearyl or nonylphenyl for example there would be employed mixed phenyl nonylphenyl phosphites or mixed phenyl stearyl phosphites of Formula 5 as starting materials having the following ratio of phenyl to nonylphenyl or stearyl groups.

TABLE 2

| Triads (n) | Phenyl groups | Nonylphenyl or stearyl groups |
|---|---|---|
| 1 | 2 | 1 |
| 2 | 2.25 | 0.75 |
| 3 | 2.33 | 0.66 |
| 4 | 2.375 | 0.625 |
| 5 | 2.40 | 0.60 |
| 6 | 2.416 | 0.583 |
| 7 | 2.43 | 0.57 |
| 8 | 2.44 | 0.56 |

While the above reactions, all of which are esterification reactions, can be carried out at atmospheric pressure or super atmospheric pressure they are preferably carried out in a vacuum, e.g. 0.1 to 100 mm. pressure, usually at 5–15 mm. pressure, at the boiling point of the monohydric alcohol or monohydric phenol which is being removed.

Unless otherwise indicated all parts and percentages are by weight.

The reactions set forth above are all preferably catalyzed with 0.1 to 5% based on the weight of the phosphite reactant or reactants of a catalyst which usually is a secondary phosphite, e.g. a dialkyl phosphite, a diaryl phosphite or a dihaloaryl phosphite or an alkaline catalyst. Examples of suitable catalysts are diphenyl phosphite, di (2-methylphenyl) phosphite, di (4-dodecylphenyl) phosphite, di (4-octadecylphenyl) phosphite, di (2-chlorophenyl) phosphite, di (2,4-dimethylphenyl) phosphite, di (4-bromophenyl) phosphite, diethyl phosphite, dicyclohexyl phosphite, phenyl 3-methylphenyl phosphite, dioctadecyl phosphite, dimethyl phosphite, sodium phenolate, sodium decylate, potassium p-cresylate, sodium ethylate, sodium octadecanolate, sodium hydride, sodium metal, potassium metal, lithium methylate, sodium cetylate, trimethyl benzyl ammonium hydroxide and other quaternary ammonium hydroxides, sodium hydroxide, potassium hydroxide calcium ethylate, sodium methylate, guanadine bases, e.g. pentamethyl guanidine.

As starting compounds having the formula

there can be used trimethyl phosphite, triethyl phosphite, triisopropyl phosphite, tributyl phosphite, trihexyl phosphite, tricyclohexyl phosphite, tris decyl phosphite, tris isodecyl phosphite, diphenyl decyl phosphite, triphenyl phosphite, tri p-cresyl phosphite, tri o-cresyl phosphite, tri 4-dodecyl phenyl phosphite, tris (alpha naphthyl) phosphite, tri 2-chlorophenyl phosphite, tri-4-bromophenyl phosphite, tris (2-chloroethyl) phosphite, tris (2-chloroisopropyl) phosphite, tris (2-bromoethyl) phosphite, tris (o-cyclohexyl phenyl) phosphite, tris (2-fluorophenyl) phosphite, tris (4-t-butylphenyl) phosphite, tris octyl phosphite, diphenyl 4-methylphenyl phosphite, tris (2,4-dichlorophenyl) phosphite, diphenyl oleyl phosphite (diphenyl-Δ9-octadecenyl phosphite), diethyl oleyl phosphite, diphenyl stearyl phosphite (diphenyl octadecyl phosphite), dibutyl stearyl phosphite, diphenyl hexadecyl phosphite, di-o-cresyl stearyl phosphite, triallyl phosphite, tricrotyl phosphite, dimethyl linoleyl phosphite, dimethyl stearyl phosphite, dimethyl oleyl phosphite, dimethyl tetradecyl phosphite, dimethyl lauryl phosphite, dimethyl alpha naphthyl phosphite, diphenyl beta naphthyl phosphite, diphenyl p-nonylphenyl phosphite, diphenyl o-octadecylphenyl phosphite, diphenyl m-octadecenyl phosphite (diphenyl oleyl phosphite), dimethyl eicosanyl phosphite, diphenyl 4-t-butylphenyl posphite, diphenyl 2,4-dichlorophenyl phosphite, diphenyly p-cyclohexylphenyl phosphite, triallyl phosphite, diphenyl 2,4-di (nonyl) phenyl phosphite, dimethyl (2,4-dibutyl) phenyl phosphite, tris 2,4-xylenyl phosphite, tris 2,6-xylenyl phosphite, tris benzyl phosphite.

Compounds such as dimethyl stearyl phosphite can be conveniently formed for example by heating 1 mole of trimethyl phosphite with 1 mole of stearyl alcohol, e.g. in the presence of a small amount of sodium methylate, and removing 1 mole of methyl alcohol. Compounds such as diphenyl p-nonylphenyl phosphite can be formed in analogous fashion by heating 1 mole of triphenyl phosphite with 1 mole of p-nonylphenol and removing 1 mole of pheno per se.

As used in the present specification and claims the term hydrogenated dihydric phenol signifies that all of the aromatic double bonds have been completely hydrogenated. Examples of hydrogenated dihydric phenols used to form the products of the present invention are 4,4'-isopropylidene dicyclohexanol (also called bis (4-hydroxycyclohexyl) dimethyl methane or hydrogenated Bisphenol A), di (4-hydroxycyclohexyl) methyl ethyl methane, di (4-hydroxycyclohexyl) methane, di (4-hydroxycyclohexyl), bis (2-hydroxycyclohexyl) dimethyl methane, 1,4-dihydroxycyclohexane, di (4-hydroxy-3-methylcyclohexyl) dimethyl methane, di (4-hydroxy-3-methylcyclohexyl) methyl methane, di (4-hedroxy-3-methyl cyclohexyl) cyclohexyl methane, di (4-hydroxycyclohexyl) sulfone, di (4-hydroxycyclohexyl) sulfide, di (3-hydroxycyclohexyl) dimethyl methane, 4,4'-methylene bis (2-methyl-6-t-butyl cyclohexanol), di (4-hydroxycyclohexyl) ether, 1,3-dihydroxycyclohexane, di (3-chloro-4-hydroxycyclohexyl) dimethyl methane.

The preferred starting hydrogenated dihydric phenols are hydrogenated bisphenols, the most preferred being hydrogenated Bisphenol A.

The compounds of the present invention in general are substantially colorless solids. They are useful as heat and light stabilizers and as antioxidants. They appear to be more stable than the polymers prepared in Friedman Patent 3,053,878.

They can be readily ground for incorporation in an amount of 0.01 to 20% into various polymers such as halogen containing resins, e.g. vinyl chloride resins, as stabilizers against heat and light or as antioxidants. They are particularly useful in stabilizing rigid polyvinyl chloride resins where many other phosphites are unsuitable.

Examples of halogenated polymers which can be stabilized with the phosphites of the present invention include chlorinated polyethylene having about 14 to about 75%, e.g. 27% chlorine, polyvinyl chloride, polyvinylidene chloride, polyvinyl bromide, polyvinyl fluoride, polyvinylidene fluoride, polytetrafluoroethylene, copolymers of vinylidene chloride with acrylonitrile (e.g. 80:20) or vinyl chloride (e.g. 85:15), copolymers of vinyl chloride with 1 to 90%, preferably 1 to 40%, by weight of copolymerizable materials such as vinyl acetate, vinylidene chloride, vinylidene fluoride, diethyl fumarate, diethyl maleate and other alkyl fumarates and maleates, vinyl propionate, methyl acrylate, ethyl acrylate, butyl acrylate, 2-ethylhexyl acrylate and other alkyl acrylates, methyl methacrylate, butyl methacrylate and other methacrylates, methyl alpha chloroacrylate, styrene, vinyl ethyl ether, vinyl methyl ketone, acrylonitrile, allylidene diacetate, trichloroethylene, etc. Typical copolymers include vinyl chloridevinyl acetate (96:4), viny chloridevinyl acetate (87:13), vinyl chloridevinyl acetate-maleic anhydride (86:13:1), vinyl chloride-vinylidene chloride (95:5), vinyl chloride-diethyl fumarate (95:5), vinyl chloride-trichloroethylene (95:5), vinylchlorideacylonitrile (60:40), vinyl chloride-2-ethylhexyl acrylate (80:20). They can also be used to stabilize resins where the halogen containing component is present in minor amount, e.g. acrylonitrile-vinyl chloride copolymer (85:15) or halogenated rubbers e.g. polychloroprene, chlorinated polyisobutylene, chlorinated natural rubber, chlorine containing polyurethanes, etc.

As is conventional in the art when the novel phosphites are employed with halogen containing resins there can be added barium, cadmium and zinc salts and synergistic activity is noted in this connection. Thus there can be included 0.5 to 10% of salts such as mixed barium-cadmium laurates, barium laurate, cadmium laurate, zinc stearate, cadmium 2-ethylhexoate, barium nonylphenolate, barium octylphenolate, barium stearate, zinc octoate.

There can also be incorporated in the vinyl chloride resins and the like 0.5 to 10% of organotin compounds particularly sulfur containing compounds such as dibutyltin bis (octyl-thioglycollate).

Conventional phenolic antioxidants can also be incorporated in an amount of 0.1 to 10%, e.g. 2,2-methylene bis (4-methyl-6-t-butylphenol), 2,4,6-tri-t-butylphenol, 4,4'-isopropylidenephenol, etc.

The novel phosphites of the present invention can also be incorporated in an amount of 0.01 to 20% as stabilizers for hydrocarbon polymers including monoolefin polymers such as polyethylene, polypropylene, ethylene-propylene copolymer, (e.g. 80:20, 50:50, 20:80), ethylene-propylene terpolymers, e.g. ethylene-propylene-cyclooctadiene terpolymer, ethylene-butene-1 copolymer, ethylene-decene-1 copolymer, polystyrene, polyolefin, e.g. diolefin polymers such as natural rubber, rubbery butadiene styrene copolymer (75:25, 60:40) cis isoprene polymer, polybutadiene, polyisobutylene, isobutylene-butadiene copolymer (butyl rubber, e.g. 97:3, 98.5:1.5). There can also be stabilized ABS rubbers and resins (acrylonitrile-butadiene-styrene terpolymers, e.g. 50:40:10).

They can be used in an amount of 0.01 to 20% to stabilize polyurethanes, (e.g. from toluene diisocyanate and polypropylene glycol molecular weight 2025), polyesters, e.g. Dacron (polyethylene terephthalate), polymeric tetramethylene terephthalate-isophthalate-sebacate, or unsaturated polyesters, e.g. ethylene glycol-propylene glycol adipate-maleate molecular weight 5000 and the corresponding polymer modified with 10% styrene, nylon, e.g. polyhexamethylene adipamide, Delrin (polymerized oxymethylene) and Celcon (oxymethylene copolymer), polyvinyl butyral, polysulfones from conjugated diolefins, sulfur dioxide and a monoethylenically unsaturated compound, e.g. a terpolymer of butadiene, sulfur dioxide and styrene as set forth in Example 1 of Mostert Patent 3,377,324, polycarbonates e.g. the reaction product of Bisphenol A with phosgene or dipheryl carbonate as well as other polycarbonates set forth in Fritz Patent 3,305,520.

When incorporated in hydrocarbon polymers it is frequently advantageous to add conventional phenolic antioxidants as set forth above and conventional additives such as dilauryl thiodipropionates.

They are also useful as stabilizers for foods, oils, lubricants, and other products which deteriorate on oxidation.

The compounds of the invention are also useful as flame and fire proofing additives in polyurethane, hydrocarbon polymers, cellulose esters and ethers, e.g. cellulose acetate, methyl cellulose, ethyl cellulose, cellulose acetate-propionate, etc.

The field of greatest utility at the moment, however, appears to be as stabilizers for rigid vinyl chloride resins. The rigid polyvinyl chloride resins normally do not contain over 10% plasticizer and can be completely devoid of plasticizer.

EXAMPLE 1

480 grams (2 moles) of hydrogenated Bisphenol A and 380 grams (1 mole) of diphenyl pentaerythritol diphosphite were heated in the presence of 3.8 grams of diphenyl phosphite as a catalyst and subjected to vacuum distillation at 5–10 mm. There were removed 188 grams (2 moles) of phenol. The residue in the pot was 672 grams (1 mole) of di (hydrogenated Bisphenol A) pentaerythritol diphosphite together with the diphenyl phosphite catalyst.

EXAMPLE 2

3 moles of di (hydrogenated Bisphenol A) pentaerythritol diphosphite, 2 moles of triphenyl phosphite and 6 grams of diphenyl phosphite (catalyst) were mixed and subjected to vacuum distillation at a temperature of up to 210° C. and a vacuum of 29.5 inches. There were removed 376 grams (4 moles) of phenol to produce as the residue the solid single Triad polymer of Formula 1 having the formula

EXAMPLE 3

The procedure of Example 2 was repeated but in place of triphenyl phosphite there was employed 2 moles of bis (phenyl) p-nonylphenyl phosphite. There were removed 4 moles of phenol to produce a solid compound of Formula 1 wherein the two $R_2$ groups were p-nonylphenyl.

EXAMPLE 4

The procedure of Example 2 was repeated but in place of triphenyl phosphite there were employed 2 moles of dimethyl stearyl phosphite and in place of diphenyl phosphite 4 grams of sodium methylate were employed. There were removed 4 moles of methyl alcohol by the vacuum distillation to produce a solid compound of Formula 1 wherein the two $R_2$ groups were stearyl (octadecyl).

EXAMPLE 5

The procedure of Example 2 was repeated but in place of triphenyl phosphite there were employed 2 moles of dimethyl oleyl phosphite and in place of diphenyl phosphite 4 grams of sodium methylate were employed. After removal of 4 moles of methyl alcohol by the vacuum distillation there was produced a solid compound of Formula 1 wherein the two $R_2$ groups were oleyl.

EXAMPLE 6

The procedure of Example 2 was repeated but in place of triphenyl phosphite there were employed 2 moles of tris isodecyl phosphite and in place of diphenyl phosphite there were used 6 grams of sodium decylate. After removal of 4 moles of isodecyl alcohol by vacuum distillation there was produced a solid compound of Formula 1 wherein the two $R_2$ groups were isodecyl.

EXAMPLE 7

6 moles of di (hydrogenated Bisphenol A) pentaerythritol diphosphite, 4 moles of triphenyl phosphite and 11 grams of diphenyl phosphite (catalyst) were mixed and subjected to vacuum distillation at a temperature up to 214° C. and a vacuum of 29.5 inches. There were removed 846 grams (9 moles) of phenol to produce as the residue the solid double Triad polymer of Formula 2 where each $R_2$ was phenyl and $m$ was zero.

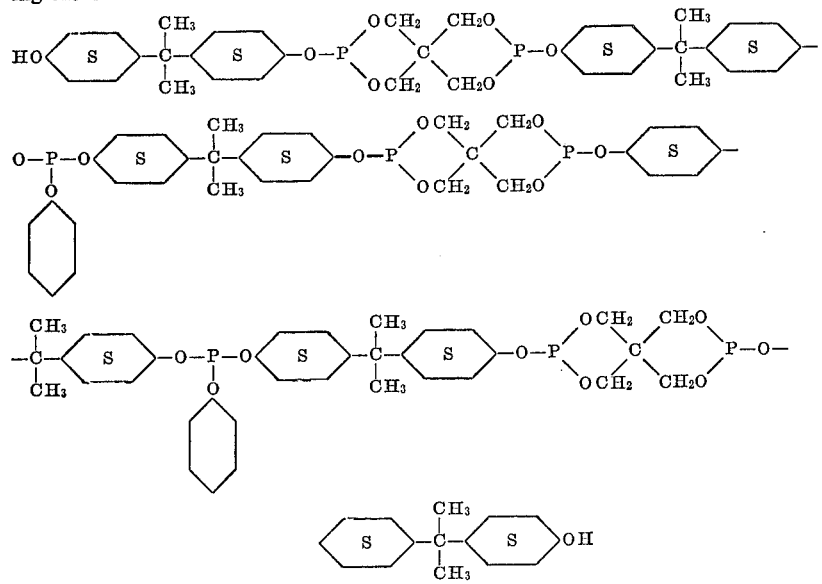

It was compatible in resins, e.g. polyvinyl chloride, and polypropylene and natural and synthetic rubbers and was effective as a stabilizer for such polymers. It was particularly effective in combination with conventional stabilizing systems such as phenols and soaps, e.g. barium-cadmium laurate, calcium stearate and zinc stearate.

EXAMPLE 8

The procedure of Example 7 was repeated but in place of triphenyl phosphite there was employed a mixture of 3 moles or bis (phenyl) p-dodecylphenyl phosphite, and 1 mole of triphenyl phosphite. There were removed 9 moles of phenol by vacuum distillation to produce a solid compound of Formula 2 where each $R_2$ group was p-dodecylphenyl and $m$ was zero.

EXAMPLE 9

By employing a mixture of 2 moles of bis (phenyl) p-dodecylphenyl phosphite and 2 moles of triphenyl phosphite in Example 8 the solid di Triad polymer of Formula 2 produced had two p-dodecylphenyl groups as $R_2$ and one phenyl group as $R_2$.

EXAMPLE 10

The procedure of Example 7 was repeated but in place of triphenyl phosphite there was employed a mixture of 3 moles of dimethyl stearyl phosphite and 1 mole of triphenyl phosphite and there was used as the catalyst 7.8 grams of sodium methylate. There were removed 9 moles of methyl alcohol by vacuum distillation to produce a solid compound of Formula 2 where each $R_2$ group was stearyl and $m$ was zero.

EXAMPLE 11

The procedure of Example 10 was repeated replacing the dimethyl stearyl phosphite by 3 moles of dimethyl oleyl phosphite and removing 9 moles of methyl alcohol by vacuum distillation to produce a solid compound of Formula 2 where each $R_2$ group was oleyl and $m$ was zero.

EXAMPLE 12

9 moles of di (hydrogenated Bisphenol A) pentaerythritol diphosphite, 6 moles of triphenyl phosphite and 10 grams of sodium phenolate (catalyst) were mixed and subjected to vacuum distillation at a temperature up to 212° C. and a vacuum of 29.5 inches. There were removed 1316 grams (14 moles) of phenol to produce as the residue the solid triple Triad polymer of Formula 2 where each $R_2$ group was phenyl and $m$ was 1.

EXAMPLE 13

The procedure of Example 12 was repeated but in place of triphenyl phosphite there was employed a mixture of 4 moles of bis (phenyl) p-octylphenyl phosphite and 2 moles of triphenyl phosphite. There were removed 14 moles of phenol by vacuum distillation to produce a solid compound of Formula 2 where each $R_2$ group was p-octylphenyl an $m$ was one.

EXAMPLE 14

The procedure of Example 12 was repeated but in place of triphenyl phosphite there was employed a mixture of 4 moles of dimethyl hexadecyl phosphite and 2 moles of trimethyl phosphite and there was used as the catalyst 11 grams of sodium methylate. There were removed 14 moles of phenol by vacuum distillation to produce a solid compound of Formula 2 where each $R_2$ group was hexadecyl and $m$ was one.

EXAMPLE 15

The procedure of Example 2 was repeated but in place or triphenyl phosphite there were employed 2 moles of tris (O-chlorophenyl) phosphite. There were removed 4 moles of O-chlorophenol by the vacuum distillation to produce a solid compound of Formula 1 wherein the two $R_2$ groups were O-chlorophenyl.

EXAMPLE 16

The procedure of Example 2 was repeated but the triphenyl phosphite was replaced by 2 moles of tris (4-methylphenyl) phosphite and the catalyst was replaced by 5 grams of sodium p-cresylate. There were removed 4 moles of p-cresol by the vacuum distillation to produce a solid compound of Formula 1 wherein the two $R_2$ groups were 4-methylphenyl.

EXAMPLE 17

The procedure of Example 1 was repeated but the 2 moles of hydrogenated Bisphenol A were replaced by 2 moles of di (4-hydroxycyclohexane). The residue in the pot was 1 mole of bis (di (4-hydroxycyclohexyl) methane) pentaerythritol diphosphite.

EXAMPLE 18

3 moles of bis(di(4-hydroxycyclohexyl)methane)pentaerythritol diphosphite prepared according to the procedure of Example 17, 2 moles of triphenyl phosphite and 6.5 grams of diphenyl phosphite were subjected to vacuum distillation in the manner set forth in Example 2. There were removed 4 moles of phenol to produce a solid single Triad polymer of Formula 1 wherein the two $R_2$ groups were phenyl.

EXAMPLE 19

The porcedure of Example 18 was repeated but in place of the triphenyl phosphite there were employed 2 moles of dimethyl stearyl phosphite and in place of diphenyl phosphite 5 grams of sodium methylate were employed. There were removed 4 moles of methyl alcohol by the vacuum distillation to produce a solid compound of Formula 1 wherein the two $R_2$ groups were stearyl and HOR was

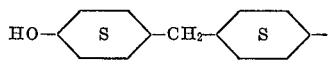

EXAMPLE 20

The procedure of Example 1 was repeated but in place of the 2 moles of hydrogenated Bisphenol A there were employed 2 moles of di(4-hydroxycyclohexyl)ether. The residue in the pot was 1 mole of bis(di(4-hydroxycyclohexyl)ether)pentaerythritol diphosphite.

EXAMPLE 21

3 moles of bis(di(4-hydroxycyclohexyl)ether)pentaerythritol diphosphite prepared according to the procedure of Example 20, 2 moles of tris octylphosphite and 9 grams of dicotyl phosphite were subjected to vacuum distillation and 4 moles of octyl alcohol removed to produce a single Triad polymer of Formula 1 wherein the two $R_2$ groups were octyl.

EXAMPLE 22

1 part of the phosphite polymer (Triad) prepared in Example 2 was mixed with 100 parts of polyvinyl chloride and 2 parts of calcium stearate to give a stabilized resin.

EXAMPLE 23

1 part of the phosphite polymer (Triad) prepared in Example 3 together with 2 parts of calcium stearate were milled into 100 parts of rigid polyvinyl chloride on a two roll mill for 10 minutes at 350° F. to produce a stabilized vinyl chloride resin.

EXAMPLE 24

The procedure of Example 23 was repeated replacing the phosphite polymer (Triad) of Example 3 by the phosphite polymer (Triad) produced in Example 4 to produce a stabilized polyvinyl chloride.

EXAMPLE 25

1 part of the phosphite polymer (Triad) prepared in Example 5 together with 2 parts of calcium stearate were milled into 100 parts of polyvinyl chloride and 50 parts of dioctyl phthalate to give a stabilized vinyl chloride polymer.

EXAMPLE 26

1 part of the phosphite polymer (di Triad) produced in Example 10 together with 1.5 parts of barium-cadmium laurate were milled into rigid polyvinyl chloride on a two-roll mill for 10 minutes at 350° F. to produce a stabilized vinyl chloride resin.

EXAMPLE 27

2 parts of the phosphite polymer produced in Example 3 and 1 part of 4,4'-isopropylidene bisphenol were mixed with 100 parts of solid polypropylene (melt index 0.8) to increase the oxidative stability of the polypropylene.

EXAMPLE 28

0.1 part of the phosphite polymer produced in Example 5, 0.3 part of dioleyl thiodipropionate and 0.3 part of 4,4′-methylene bis(3-methyl-6-t-butylphenol) were added to 100 parts of solid polypropylene (melt index 0.8) to improve its oxidative resistance.

EXAMPLE 29

0.5 part of the phosphite polymer produced in Example 4 and 0.5 part of 4,4′-thiobis (2-methyl-6-t-butylphenol) were milled into 100 parts of SBR rubber (60% butadiene-40% styrene) to give a stabilized product.

In the claims an S inside a ring indicates the ring is completely saturated.

While the phosphites of the present invention are effective stabilizers for both vinyl chloride resins and hydrocarbon polymers many known phosphites which are stabilizers for vinyl chloride resins are relatively ineffective with hydrocarbon ploymers, e.g., tris decyl phosphite and diphenyl decyl phosphite are not good stabilizers for hydrocarbon polymers. Unpredictability of stabilizer activity for phosphites is also shown in Buckley Pat. 3,342,767 and Fritz Pat. 3,305,520.

What is claimed is:

1. A polymeric phosphite having one of the formulae (1)  HORO—R₁ORO—P—OROR₁ORO—P—OROR₁OROH
                  ‖                ‖
                  O                O
                  R₂               R₂ and (2)  HOROR₁—ORO—P—OROR₁ORO—P—OROR₁OROH
                ‖              ‖
                O              O
                R₂             R₂
     ⎣(ROR₁ORO—P—OROR₁ORO—P—OROR₁OROH)ₘ
                ‖              ‖
                O              O
                R₂             R₂
     ⎣ROR₁ORO—P—OROR₁ORO—P—OROR₁OROH
              ‖              ‖
              O              O
              R₂             R₂ where R is the divalent residue of a hydrogenated dihydric phenol from which the two hydroxyl groups have been removed, said hydrogenated dihydric phenol having 1 to 2 rings, any substituent on the rings being hydrogen alkyl of 1 to 4 carbon atoms or chlorine, any link between two rings being (X)ₙ where X is O, S, SO₂ or

where R₄ and R₅ are hydrogen, lower alkyl or phenyl, n is zero or one, R₁ is

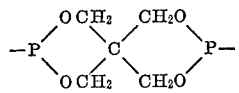

R₂ is alkyl of 1 to 20 carbon atoms, phenyl, alkyl phenyl having 1 to 18 carbon atoms in the alkyl group, naphthyl, benzyl, halophenyl, haloalkyl of 2 to 3 carbon atoms where the halogen is chlorine or bromine, or alkenyl of 3 to 18 carbon atoms and m is zero or an integer.

2. A phosphite according to claim 1 having Formula 1.

3. A phosphite according to claim 2 wherein the hydrogenated dihydric phenol residue is a residue having the formula

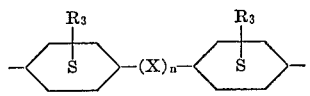

where R₃ is hydrogen or 1 to 4 carbon atom alkyl, X is O, S, SO₂ or

where R₄ and R₅ are hydrogen, lower alkyl or phenyl and n is zero or one.

4. A phosphite according to claim 3 wherein R is the residue of 4,4′-isopropylidene dicyclohexanol.

5. A phosphite according to claim 4 wherein R₂ is phenyl.

6. A phosphite according to claim 4 wherein R₂ is alkylphenyl having 8 to 20 carbon atoms in the alkyl group.

7. A phosphite according to claim 4 wherein R₂ is alkyl of 8 to 20 carbon atoms.

8. A phosphite according to claim 7 wherein R₂ is stearyl.

9. A phosphite according to claim 4 wherein R₂ is oleyl.

10. A phosphite according to claim 2 having Formula 2.

11. A phosphite according to claim 10 where m is 0.

12. A phosphite according to claim 11 wherein the hydrogenated dihydric phenol residue is a residue having the formula

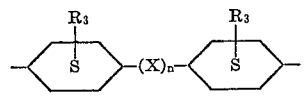

where R₃ is hydrogen or 1 carbon atom alkyl, X is O, S, SO₂, or

where R₄ and R₅ are hydrogen, lower alkyl or phenyl and n is zero or one.

13. A phosphite according to claim 12 wherein R is the residue of 4,4′-isopropylidene dicyclohexanol.

14. A phosphite according to claim 13 wherein R₂ is phenyl.

15. A phosphite according to claim 13 wherein R₂ is alkylphenyl having 8 to 20 carbon atoms in the alkyl group.

16. A phosphite according to claim 13 wherein R₂ is alkyl of 8 to 20 carbon atoms.

17. A phosphite according to claim 13 wherein R₂ is alkenyl of 18 carbon atoms.

18. A phosphite according to claim 11 where m is 1.

19. A phosphite according to claim 18 wherein the hydrogenated dihydric phenol residue is a residue having the formula

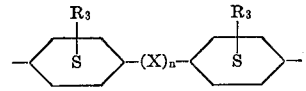

where $R_3$ is hydrogen or 1 carbon atom alkyl, X is O, S, $SO_2$, or
where $R_4$ and $R_5$ are hydrogen, lower alkyl or phenyl and $n$ is zero or one.
20. A phosphite according to claim 19 wherein R is the residue of 4,4'-isopropylidene dicyclohexanol.
References Cited
UNITED STATES PATENTS
| | | | |
|---|---|---|---|
| 3,039,993 | 6/1962 | Friedman | 260—927X |
| 3,330,888 | 7/1967 | Friedman | 260—927 |
CHARLES B. PARKER, Primary Examiner
R. L. RAYMOND, Assistant Examiner
U.S. Cl. X.R.
260—45.95